United States Patent [19]

Brick

[11] E Patent Number: Re. 33,002

[45] Reissued Date of Patent: Aug. 1, 1989

[54] HIGH-POWER RESCUE TOOL

[75] Inventor: Francis M. Brick, Dresher, Pa.

[73] Assignee: F. M. Brick Industries, Inc., Hatboro, Pa.

[21] Appl. No.: 110,549

[22] Filed: Oct. 16, 1987

Related U.S. Patent Documents

Reissue of:

[64] Patent No.: 4,531,289
Issued: Jul. 30, 1985
Appl. No.: 461,853
Filed: Jan. 28, 1983

U.S. Applications:

[63] Continuation of Ser. No. 853,422, Apr. 18, 1986, abandoned.

[51] Int. Cl.[4] ..... B25F 1/100; B26B 15/00

[52] U.S. Cl. ..... 30/134; 30/228; 30/260

[58] Field of Search ..... 30/134, 180, 228, 260

[56] References Cited

U.S. PATENT DOCUMENTS

| | | | |
|---|---|---|---|
| 3,039,189 | 6/1962 | McBerty | 30/245 |
| 3,533,162 | 10/1970 | Pacitti | 30/260 |
| 3,819,153 | 6/1974 | Hurst | 72/705 |
| 3,826,155 | 7/1974 | Muller | 428/408 X |
| 3,971,131 | 7/1976 | Boyajian | 30/260 |
| 4,193,189 | 3/1980 | Marin | 30/260 |
| 4,333,330 | 6/1982 | Porter | 72/392 |
| 4,392,263 | 7/1983 | Amoroso | 30/134 |
| 4,397,048 | 8/1983 | Brown | 264/258 |
| 4,403,431 | 9/1983 | Ramun et al. | 30/134 X |

FOREIGN PATENT DOCUMENTS 2621249 9/1978 Fed. Rep. of Germany .

OTHER PUBLICATIONS

Model 25b, Spreader & Cutter, Lukas' American Inc.

*Primary Examiner*—Frank T. Yost
*Assistant Examiner*—Michael D. Folkerts
*Attorney, Agent, or Firm*—William H. Eilberg

[57] ABSTRACT

The invention comprises a hydraulic rescue tool which is useful in extricating victims [form] *from* traffic accidents. The tool can perform three basic functions: pushing, pulling, and cutting. The tool comprises a pair of pivotably mounted arms connected to each other within a common yoke. The arms are forced together or apart by a hydraulically operated piston. Attached to the arms are a pair of cutting blades. The arms are made of a graphite laminate composite material for increased strength.

4 Claims, 3 Drawing Sheets

HIGH-POWER RESCUE TOOL

Matter enclosed in heavy brackets [ ] appears in the original patent but forms no part of this reissue specification; matter printed in italics indicates the additions made by reissue.

*This application is a continuation of application Ser. No. 853,422, filed Apr. 18, 1986, now abandoned.*

BACKGROUND OF THE INVENTION

The present invention is a hydraulic rescue tool which can be used to remove victims from the wreckage of traffic accidents, or to perform other tasks requiring substantial amounts of power, such as prying, lifting, squeezing, cutting, and the like.

Rescue tools for extricating victims from accidents have only recently become available. The tools of the prior art have comprised a pair of arms, disposed symmetrically around a central axis, the arms being pivotably mounted at points on the periphery of the apparatus. A hydraulically-operated piston has been used to push the arms apart or to pull the arms together, the pushing or pulling being done with extraordinary force. The operation of pushing the arms apart is useful in prying open pieces of mangled metal within which a victim is trapped. The operation of pulling the arms together is useful in lifting heavy objects, provided that the necessary chains or other media are fastened to the arms and to the object to be lifted.

An example of a hydraulic rescue tool of the prior art is shown in German Pat. No. 2621249.

The first rescue tools manufactured were made of light-weight, high-strength metals, such as titanium and steel. Subsequent tools have appeared on the market which are of all-metal construction, with lesser strength-to-weight ratios. The most powerful portable rescue tool in the prior art weighs over 70 pounds. Because rescue tools of this type are generally used in an environment of considerable stress and urgency, it is essential that the tool not be too heavy, so that it can be easily maneuvered without causing excessive fatigue on the operator. The use of a powerful, heavy, and poorly-balanced rescue tool in a restricted space can be dangerous to both the rescuer and the accident victim. There is thus a need for a relatively light-weight, and easily operated rescue tool.

During rescue operations, it is also necessary to cut through metal. Attempts have been made to add scissor-like blades to the arms of conventional rescue tools. However, such attempts have not been successful. The cantilevered weight of the blade has proved too unwieldy, and the arms holding the blades would flex and snap shut. There was also a problem involving breakage of the pin holding the scissors to the arms, due to hypersonic vibrations. Just as a conventional scissors will not cut a piece of paper cleanly unless the blades are held firmly together, the blades in prior art rescue tools could not adequately cut metal, because the arms could not be adequately held together, and were not of sufficient rigidity to maintain their precise, desired positions. The present invention provides a structure which also solves the above-described problem.

Thus, the invention discloses a powerful, relatively light-weight, well-balanced, and easily operated rescue tool which provides the capability of pushing, pulling, and cutting in a single tool.

SUMMARY OF THE INVENTION

The present invention comprises a pair of symmetrical arms, mounted on a frame. The arms are connected to a common yoke disposed along the axis of symmetry of the arms, and are pushed apart or pulled together by a piston means, which is hydraulically operated and which is attached to the yoke. Attached to the arms are a pair of cutting blades. The arms are made of a graphite laminate composite material which adds considerably to the strength of the arms. The tool is powered by a portable hydraulic power unit which, through appropriate valve means, directs high-pressure fluid into a region on either side of the piston, forcing the piston to move in the desired direction. The arms are thus forced apart or together, according to the direction of the piston.

Accordingly, an object of the present invention is to provide a rescue tool which can be used to extricate victims from the wreckage of traffic accidents.

It is a further object of the present invention to provide a rescue tool as described above, which tool is capable of pushing, pulling and cutting, all with extraordinary power.

It is a further object of the invention to provide a rescue tool as described above, which tool is portable, relatively light-weight, well-balanced, and easily operated.

It is a further object of the invention to provide a rescue tool as described above, wherein the arms of the tool are constructed of an extremely rigid graphite laminate composite material.

Other objects and advantages of the invention will be apparent to those skilled in the art from a reading of the following brief description of the drawings, the detailed description of the invention, and the appended claims.

DETAILED DESCRIPTION OF THE INVENTION

Figure 1:
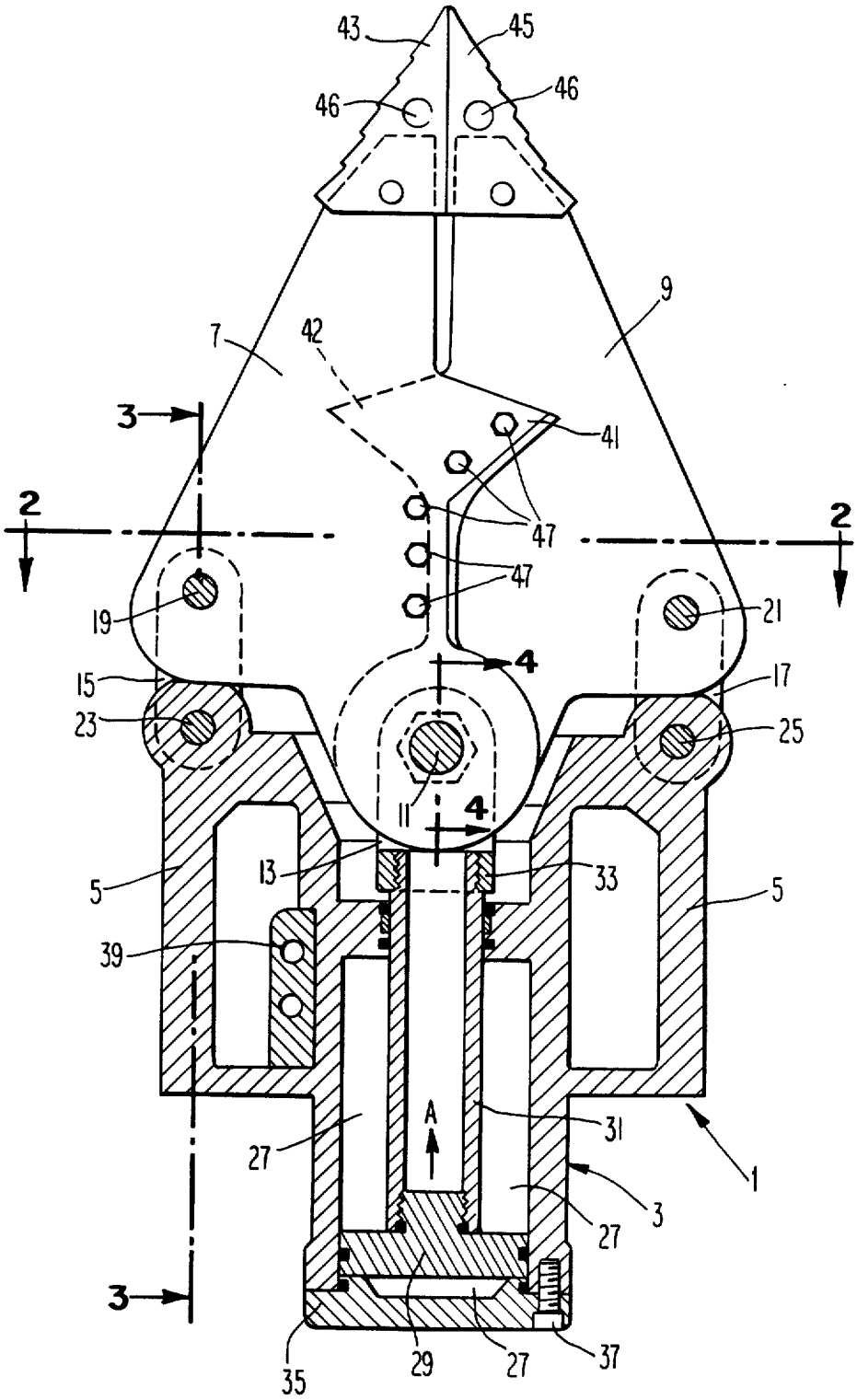
FIG. 1 is an elevational view, partly in cross-section, of the rescue tool.

The present invention is shown in an elevational view, partially in cross-section, in FIG. 1. There is shown rescue tool 1 having a frame 3 which is constructed so as to be integrally formed with handles 5. A pair of arms 7 and 9 are attached to each other by bolt 11 mounted through yoke 13.

The arms are constructed of a graphite laminate composite material with a directional fiber orientation to maximize strength and stiffness. The frame may be constructed of metal, or of a hybrid of metal and graphite. Thus, the arms are essentially graphite-reinforced plastic, while the frame is metal or graphite-reinforced.

The arms made of the graphite laminate composite are extremely strong, but are of lighter weight than the metal arms known in the prior art. The arms in the present invention may weigh about two pounds, while the steel arms used previously might be 9½ pounds. Unlike those of the prior art, the arms of the present invention are flat plates, and need not be made of I-beam or box cross-section. Despite being flat plates, the arms maintain their rigidity. The overall weight of the complete tool is approximately 50 pounds, a substantial reduction compared to the prior art tools which have weighed as much as 70 pounds, or more.

Arms 7 and 9 are also connected to frame 3 by pivot links 15 and 17. The pivot links are connected to the arms 7 and 9 by arm pins 19 and 21, and are connected to the frame 3 by pivot pins 23 and 25.

Disposed within hollow cylindrical region 27 is piston 29. Piston 29 is adapted to push on yoke 13, through hollow cylinder 31 which is connected directly to the base 33 of yoke 13. Region 27 is adapted to receive high-pressure fluid, as will be described below. Region 27 is further defined by end cap 35 which is attached to frame 3 by bolt 37.

Valve block 39 is mounted on frame 3, and holds the valves that are used for directing fluid into the regions around the piston, as will be described more fully below.

Attached to arms 7 and 9 are a pair of cutting blades 41 and 42 (blade 42 being shown in phantom, as the blades overlap each other when the arms 7 and 9 are together). Due to the composition of the arms, the arms maintain their rigidity such that when the arms come together, the blades cut like a scissors. That is, the blades will not separate while cutting but will make a clean, sharp cut.

Attached to the tips of arms 7 and 9 are work jaws 43 and 45. The work jaws, which can be made of steel, have holes 46 which are suitable for insertion of chains or nylon belts to perform lifting operations.

Work jaws 43 and 45 are used as the working tool surfaces for pushing, prying and lifting. The work jaws will become worn with use, and may be replaced. They are attached to arms 7 and 9 by a pin with an internal ball detent (not shown) to prevent accidental withdrawal, but which is removable by hand, thus making it possible to replace the work jaws in the field, without tools. The holes 46 can be used to attach chains or nylon belts, or other material of high tensile strength, in order to use the tool for lifting.

The cutting blades 41 and 42 are attached to their respective arms by a plurality of bolts 47.

As is apparent from FIG. 1, when piston 29 is forced upward, as indicated by the direction of arrow A, the arms 7 and 9 separate. As the arms separate, they are free to pivot on links 15 and 17, as well as around yoke 13. Conversely, when the piston is moved downward, the arms 7 and 9 are forced together. When the hydraulic pressure on the piston 29 is sufficiently great, the arms 7 and 9 can be forced together or apart with extraordinary power, and can be used to push or pull with tremendous strength. Also, when the arms 7 and 9 are forced together, blades 41 and 42 can be utilized as a high-powered scissors for cutting through metal.

It is to be appreciated that the fixed point of rotation of the arms is at the center of the apparatus, i.e. at the yoke 13, and not at the outer edges of the apparatus. As the piston 29 is moved, the arms are allowed to rotate around arm pins 19 and 21, and the arm pins also move, by virtue of rotation of the links 15 and 17 around pivot pins 23 and 25. Because the force is applied at one point in the center (and not at two points, on the ends, as was done in the prior art), it is possible to make the distance from the yoke 13 to the arm pins 19 and 21 greater, thus increasing the lever arm length, and improving performance. In fact, the ability to use a longer lever arm results in the ability to achieve the same force with a smaller piston, thus reducing the weight of the tool.

Figure 2:
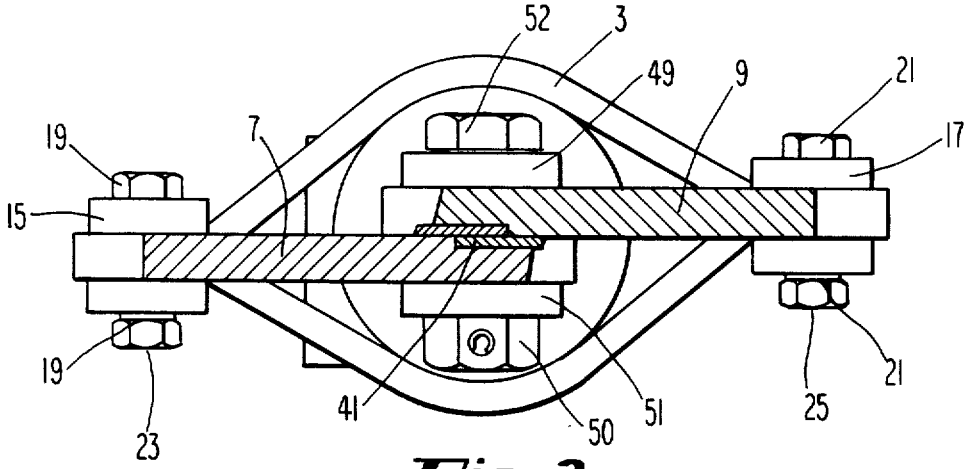
FIG. 2 is a cross-sectional view taken along the line 2—2 of FIG. 1.
Figure 3:
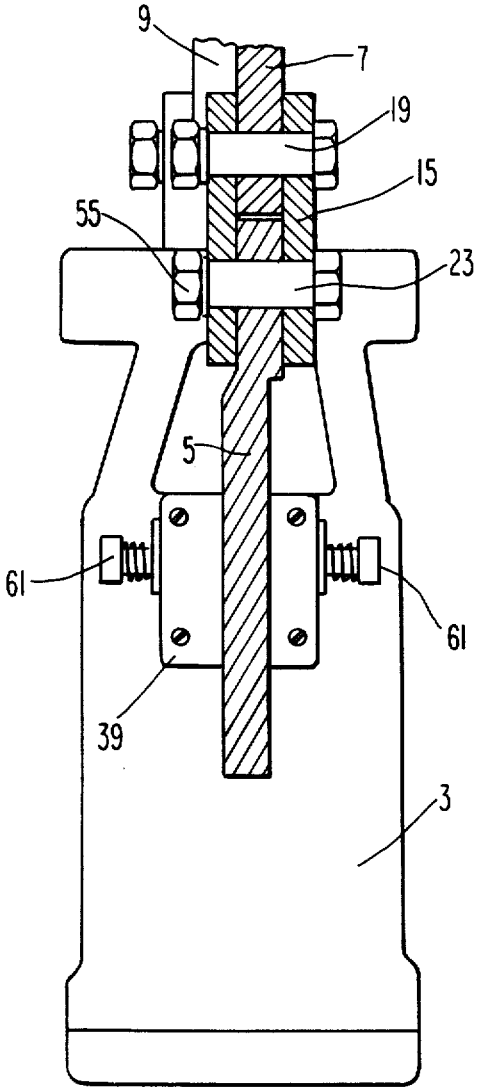
FIG. 3 is a cross-sectional view taken along the line 3—3 of FIG. 1.

The detailed structure of the links and the yoke are further illustrated in FIGS. 2 and 3. FIG. 2, which is a cross-sectional view taken along the lines 2—2 of FIG. 1, shows frame 3 and arms 7 and 9. Arms 7 and 9 are shown attached to links 15 and 17 by arm pins 19 and 21. Also shown are pivot pins 23 and 25, which attach the links 15 and 17 to frame 3.

Also visible in FIG. 2 are cutting blades 41 and 42. The arms 7 and 9 are sandwiched between members 49 and 51 of yoke 13 (see FIG. 1). Clamped around members 49 and 51 are bolt 52 and nut 50.

FIG. 3, which is a cross-sectional view taken along the line 3—3 of FIG. 1, provides more detailed illustration of link 15. Arm pin 19 is shown holding arm 7 to link 15. The frame pivot bolt 23 and pivot pin nut 55 are shown. Also visible, mounted on handle 5 is valve block 39 to which are attached valve triggers 61. The valve triggers 61 are used to control the tool manually. When the appropriate trigger is squeezed, the arms are made to open or close, according to the direction of high-pressure fluid flow in the hydraulic system, which will be explained below.

Figure 6:
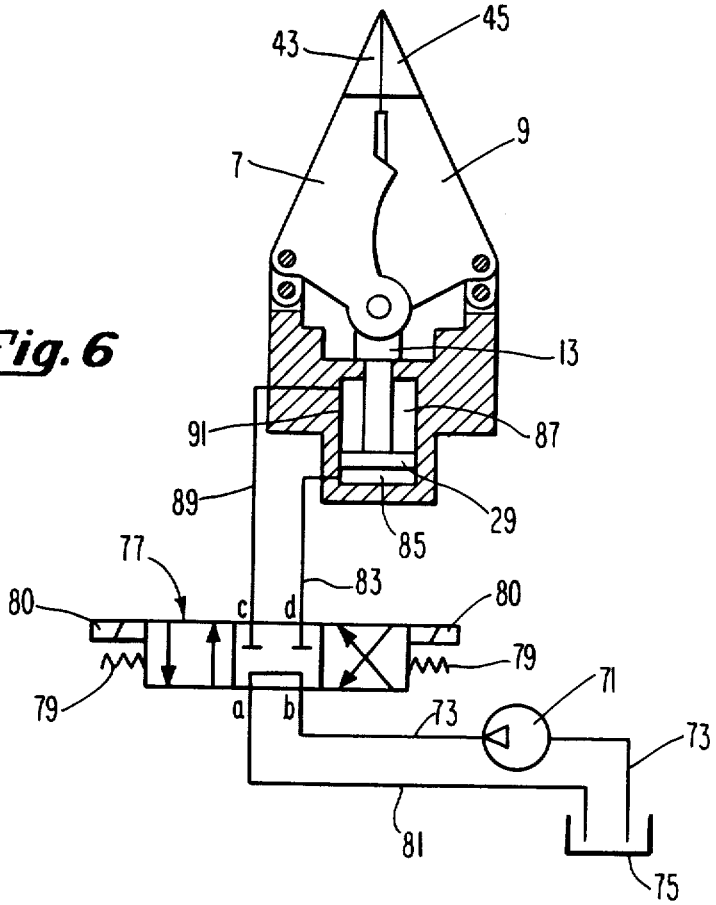
FIG. 6 is a schematic diagram showing the operation of the hydraulic system of the rescue tool.

FIG. 6 is a schematic diagram of the hydraulic system, together with an abbreviated cross-sectional elevation of the rescue tool. Although the rescue tool, as shown in FIG. 6, is not identical to that shown in FIG. 1, it is understood that FIG. 6 represents the same rescue tool as that in FIG. 1, and thus some of the same reference numerals are used in the schematic drawing of FIG. 6, for purposes of clarity. FIG. 6 shows hydraulic pump 71 which draws fluid along line 73 from reservoir 75. FIG. 6 also depicts schematically valve 77 which has four ports and three positions. Valve 77 is centered by spring means 79, and is manually operated by pressing triggers 80. The triggers 80 are either identical to, or are operatively connected to, the valve triggers 61 of FIG. 3.

The ports of valve 77 are indicated by the letters a, b, c, and d. In the quiescent position, which is the position shown in FIG. 6, ports a and b are connected within valve 77, so that fluid from reservoir 75 is pumped along line 73 and back to reservoir 75 through line 81.

When valve 77 is moved to the right in FIG. 6, fluid pumped by pump 71 through line 73 enters the valve 77 at port b and exits valve 77 at port d along line 83. The fluid then enters lower region 85 of the cylinder 91. At the same time, any fluid that is in upper region 87 of cylinder 91 is drawn out through line 89, entering valve 77 at port c, exiting valve 77 at port a, and returning to reservoir 75 through line 81. The net effect is to cause an increase in pressure in region 85 and a decrease in pressure in region 87, thereby causing piston 29 to move up, and to force arms 7 and 9 apart.

Conversely, when valve 77 is moved to the left in FIG. 6, fluid pumped by pump 71 through line 73 enters valve 77 at port b and exits valve 77 at port c, and travels through line 89 into upper region 87 of cylinder 91. At the same time, fluid in lower region 85 of cylinder 91 exits the cylinder through line 83, and enters valve 77 at port d, leaves valve 77 at port a, and returns to reservoir 75 through line 81. The net effect is an increase in pressure in upper region 87, and a decrease in pressure in lower region 85, causing piston 29 to move downward, thereby causing the arms 7 and 9 to come together.

The hydraulic system is portable, and the pressure lines shown schematically in FIG. 6 are preferably flexible hoses with quick-connect couplings having appropriate check valves. The operating pressure of the system should be at least 5,000 p.s.i. For a pulling distance of 32 inches, a minimum opening force of 12,000 pounds is required. A cutting force of 40,000 pounds is also needed.

Figure 4:
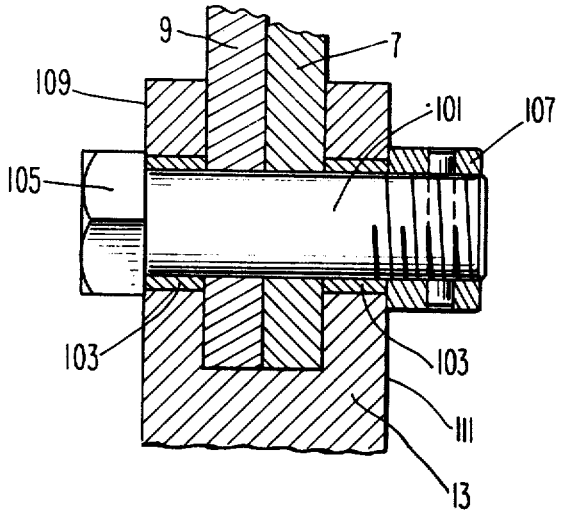
FIG. 4 is a cross-sectional view of the yoke assembly taken along the line 4—4 of FIG. 1.
Figure 5:
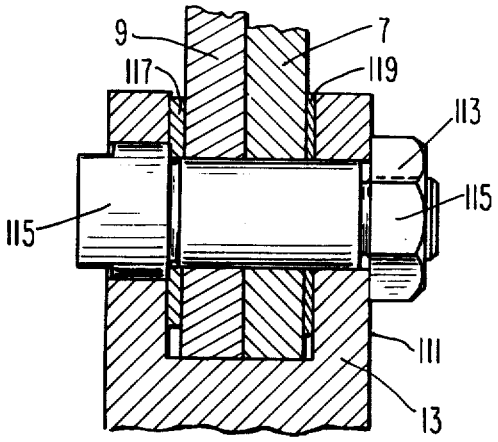
FIG. 5 is a cross-sectional view of the yoke assembly in an alternative embodiment, taken in the same direction as in FIG. 4.

FIGS. 4 and 5 together illustrate the attachment of the arms to the yoke in the embodiment described above, and in an alternative embodiment. Both figures are taken in a direction indicated by line 4—4 of FIG. 1. FIG. 4 shows the embodiment used in the tool described so far. Arms 7 and 9 are shown held within yoke 13 by bolt 101, the bolt being mounted within bushing 103. It is seen that head 105 of bolt 101, and nut 107 press upon the external surfaces 109 and 111 of yoke 13. Although this embodiment has been found to produce a workable tool, it has the disadvantage that, because of the tightness of the nut and bolt, the yoke may be deformed when this embodiment is used. The embodiment shown in FIG. 4 produces a mechanical couple on the yoke, which tends to twist the yoke.

The alternative embodiment, illustrated in FIG. 5, avoids the problem of deformation of the yoke. In this embodiment, there is effectively only one member, namely nut 113, pressing upon an external surface 111 of yoke 13. Bolt 115 is disposed within yoke 13, and rests upon a portion of washer 117. Glide washer 119 separates yoke 13 from arms 7. It is found that this arrangement avoids the deformation problem described above.

It is apparent that the objects of the present invention are fulfilled by the above disclosure. Many modifications to the basic design are possible. All such modifications which would be apparent to those skilled in the art are deemed within the spirit and scope of the following claims.

What is claimed is:

[1. A rescue tool, comprising:

a frame, a pair of substantially flat arms, the arms being pivotably mounted in a common yoke, the yoke being attached to a piston means disposed within the frame, the frame defining a region within which the piston means can move upward and downward, wherein upward movement of the piston means causes the arms to separate, and wherein downward movement of the piston means causes the arms to come together, the arms being connected to the frame by a pair of links, the links being spaced equidistant from the yoke, the links being pivotably mounted to the frame and to the arms, hydraulic means for moving the piston means upward and downward within the frame, and blade means attached to the arms, the blade means being distinct from the arms, wherein both of the arms have the general shape of a solid right triangle, and wherein the arms, when together, form a substantially soild triangular shape, the arms being constructed of a graphite laminate composite material.]

[2. The tool of claim 1, wherein the arms are held within the yoke by a pair of substantially flat yoke members, the sides of the arms opposite the yoke members both having a recess, each recess being shaped to receive one of the blade means, wherein each blade means, in combination with its associated arm, forms a substantially flat surface, wherein both of the flat surfaces formed by the respective arms and blade means are held firmly against each other within the yoke.]

[3. The tool of claim 2, wherein the moving means comprises means for introducing high-pressure fluid into the regions on either side of the piston means, such that the piston means may be moved in a direction away from the fluid-containing region.]

[4. The tool of claim 3, further comprising a pair of work jaws, the work jaws being attached to the tips of the arms.]

[5. The tool of claim 4, wherein the work jaws have holes disposed therein, the holes being adapted for insertion of chains or other high tensile strength media.]

[6. The tool of claim 5, wherein the introducing means comprises a hydraulic system, the system comprising:

reservoir means for storing fluid, duct means for carrying fluid out of and into the reservoir means, four-port valve means connected to the duct means and to the regions adjacent to the piston means, and pump means for pumping fluid out of the reservoir means and towards the valve means.]

[7. The tool of claim 6, wherein the valve means has three positions, the first position being connected to direct fluid from the reservoir means into a first region and out of a second region adjacent the piston means, the second position being connected to direct no fluid into or out of the regions adjacent the piston means, and the third position being connected to direct fluid from the reservoir into the second region and out of the first region adjacent the piston means.]

[8. The tool of claim 7, wherein the valve means is manually operable, the valve means being operable by trigger means mounted on the frame.]

[9. The tool of claim 2, wherein the yoke members are held against the arms by a nut means and a bolt means, the head of the bolt means being disposed in a recess in one of the yoke members, and the nut means being positioned on the exterior side of the other of the yoke members.]

[10. The tool of claim 9, further comprising washer means disposed between the yoke members and the respective arms.]

[11. A high power rescue tool, comprising:

a frame, a pair of arms connected to the frame, the arms being pivotably mounted within a yoke and also pivotably mounted to the frame by a pair of pivot links disposed on the periphery of the frame, the yoke being connected to a piston, the piston being movable upwards and downwards within a cylindrical space defined by the frame, wherein upward movement by the piston tends to force the arms to separate, and wherein downward movement by the piston tends to force the arms to come together, the arms comprising similar, substantially solid, right triangular members, the arms being constructed of graphite laminate composite material, a pair of blades attached to the arms, the blades being distinct from the arms, wherein the arms are mounted within two yoke members, the arms having recesses shaped to receive each of the blades, each combination of arm and blade forming a substantially flat surface, the surfaces being urged together by fastening means on the exterior of the yoke.]

*12. A high-power, portable rescue tool, comprising:*

*a frame,*

*a pair of substantially flat arms, the arms being pivotably mounted in a common yoke, the yoke being attached to a piston means disposed within the frame, the frame defining a region within which the piston means can move upward and downward, wherein upward movement of the piston means causes the arms to separate, and wherein downward movement of the piston means causes the arms to come together,*

*the arms being connected to the frame by a pair of links, the links being spaced equidistant from the yoke, the links being pivotably mounted to the frame and to the arms,*

*hydraulic means for moving the piston means upward and downward within the frame, and*

*blade means attached to the arms, the blade means being distinct from the arms, the arms being constructed of a lightweight material.*

*13. A high-power, portable rescue tool, comprising:*

*a frame,*

*a pair of substantially flat arms, the arms being pivotably mounted in a common yoke, the yoke being attached to a piston means disposed within the frame, the frame defining a region within which the piston means can move upward and downward, wherein upward movement of the piston means causes the arms to separate, and wherein downward movement of the piston means causes the arms to come together,*

*the arms being connected to the frame by a pair of links, the links being spaced equidistant from the yoke, the links being pivotably mounted to the frame and to the arms,*

*hydraulic means for moving the piston means upward and downward within the frame, and*

*blade means attached to the arms, the blade means being distinct from the arms, the arms being constructed of a lightweight material,*

*wherein the arms are held within the yoke by a pair of substantially flat yoke members, the sides of the arms opposite the yoke members both having a recess, each recess being shaped to receive one of the blade means, wherein each blade means, in combination with its associated arm, forms a substantially flat surface, wherein both of the flat surfaces formed by the respective arms and blade means are held firmly against each other within the yoke.*

*14. A high-power, portable rescue tool, comprising:*

*a frame,*

*a pair of substantially flat arms, the arms being pivotably mounted in a common yoke, the yoke being attached to a piston means disposed within the frame, the frame defining a region within which the piston means can move upward and downward, wherein upward movement of the piston means causes the arms to separate, and wherein downward movement of the piston means causes the arms to come together,*

*the arms being connected to the frame by a pair of links, the links being spaced equidistant from the yoke, the links being pivotably mounted to the frame and to the arms,*

*means for introducing high-pressure fluid into spaces on either side of the piston means, such that the piston means may be moved upward and downward within the frame, in response to the pressure of fluid, and*

*blade means attached to the arms, the blade means being distinct from the arms, the arms being constructed of a lightweight material,*

*wherein the arms are held within the yoke by a pair of substantially flat yoke members, the sides of the arms opposite the yoke members both having a recess, each recess being shaped to receive one of the blade means, wherein each blade means, in combination with its associated arm, forms a substantially flat surface, wherein both of the flat surfaces formed by the respective arms and blade means are held firmly against each other within the yoke, and*

*wherein the introducing means comprises a reservoir for storing fluid, duct means for carrying fluid out of and into the reservoir, a four-port valve means connected to the duct means and to the spaces adjacent to the piston means, and means for pumping fluid out of the reservoir and towards the valve means.*

*15. A high-power, portable rescue tool, comprising:*

*a frame,*

*a pair of arms, the arms being pivotably mounted in a common yoke, the yoke being attached to a piston means disposed within the frame, the frame defining a region within which the piston means can move upward and downward, wherein upward movement of the piston means causes the arms to separate, and wherein downward movement of the piston means causes the arms to come together,*

*the arms being connected to the frame by a pair of links, the links being pivotably mounted to the frame and to the arms,*

*hydraulic means for moving the piston means upward and downward within the frame, and*

*blade means attached to the arms, the blade means being distinct from the arms, the arms being constructed of a lightweight material.*

* * * * *